UNITED STATES PATENT OFFICE.

ISAAC P. WENDELL, OF PHILADELPHIA, PENNSYLVANIA, ASSIGNOR TO THEODORE P. MATTHEWS, OF SAME PLACE.

ANTI-FRICTION COMPOSITION.

SPECIFICATION forming part of Letters Patent No. 368,636, dated August 23, 1887.

Application filed December 14, 1886. Serial No. 221,557. (No specimens.)

*To all whom it may concern:*

Be it known that I, ISAAC P. WENDELL, a citizen of the United States, residing in the city of Philadelphia, in the county of Philadelphia and State of Pennsylvania, have invented certain new and useful improvements in compositions of matter for manufacturing washers and for use as packing material for car-axle boxes, &c., of which the following is a specification.

My invention relates to that class of compositions of matter especially adapted for use in the manufacture therefrom of washers, and also for use as packing material for car-axle boxes and other like purposes.

The object of my invention is to provide an inexpensive material having the proper toughness and hardness for these purposes, which shall also be more or less self-lubricating.

My invention consists of a combination of ingredients assembled in the manner hereinafter set forth.

In preparing my improved material for washers and packing I first make a glue solution combined with resinous matter, by dissolving one ounce of gum-sandarac and one ounce of gum-mastic in one pint of alcohol, and afterward adding thereto one ounce of spirits of turpentine. When these ingredients are well incorporated, I take one part thereof and add thereto one part of a solution of glue made by dissolving one-fourth of a pound of ordinary glue of commerce in one pint of water, and I then thoroughly mix together the resinous solution and the glue solution by heating them nearly to the boiling-point and stirring. I then take one part, by measure, of the glue solution combined with resinous matter; one part, by measure, of pulverized asbestus; two parts, by measure, of fibrous asbestus; two parts, by measure, of wood or vegetable fiber, and a sufficient quantity of coloring-matter to impart to the mass the particular shade of color it may be desired that the product shall possess, and knead, work, and incorporate the whole together into a stiff paste, which I then mold or otherwise manipulate into the desired form and dry, either with or without the use of artificial heat, and with or without subjecting the same to pressure. I also use three parts of powered talc as a substitute for the fibrous and powdered asbestus and in lieu and stead thereof, the one substance being the equivalent of the other as a body material for the purposes of this composition.

If desired, I may dispense with the coloring-matter altogether without interfering with the essential character of my invention.

I do not confine myself strictly to the proportions named, as I have found that all of them may be varied within certain limits and yet produce an effective material for the manufacture of tough, hard, and self-lubricating washers and packing; nor is it essential to make the glue solution combined with resinous matter precisely as described; but I have found in practice that the best results are secured by the combination in the proportions above set forth.

What I claim, and desire to secure by Letters Patent, is—

1. A composition of matter consisting of a mineral substance, as asbestus, glue, resinous matter, and vegetable fiber, substantially as set forth.

2. A composition of matter consisting of a mineral substance, as asbestus, glue, resinous matter, vegetable fiber, and a coloring-matter, substantially as set forth.

In testimony whereof I have signed my name to this specification in the presence of two subscribing witnesses.

ISAAC P. WENDELL.

Witnesses:
 HAROLD TYNDALE,
 W. G. WENDELL.